United States Patent [19]

Lemke et al.

[11] Patent Number: 5,178,742
[45] Date of Patent: Jan. 12, 1993

[54] METHOD OF AND APPARATUS FOR FORMING A MICROMELT STRUCTURE ON AN ELECTRICALLY-CONDUCTIVE PROBE TIP

[75] Inventors: Heiko Lemke, Hungen; Thomas Göddenhenrich; Hans-Peter Bochem, both of Jülich; Uwe Hartmann, Niederzier, all of Fed. Rep. of Germany

[73] Assignee: Forschungszentrum Julich GmbH, Julich, Fed. Rep. of Germany

[21] Appl. No.: 665,769

[22] Filed: Mar. 7, 1991

[30] Foreign Application Priority Data

Mar. 8, 1990 [DE] Fed. Rep. of Germany ....... 4007292

[51] Int. Cl.$^5$ .................... C25F 3/00; B23H 7/00; B23H 7/30; B23H 9/08
[52] U.S. Cl. .................... 204/129.55; 204/225; 204/224 M; 204/228; 204/400; 219/56.1; 219/56.21; 219/56.22; 219/68; 219/69.18
[58] Field of Search ............ 204/129.55, 224 M, 225, 204/129.43, 228; 219/68, 69.12, 69.1, 56.22, 121.38, 56.21, 69.18; 445/46, 58; 427/37, 49

[56] References Cited

U.S. PATENT DOCUMENTS

| | | | |
|---|---|---|---|
| 2,628,936 | 2/1953 | Albano | 204/129.55 |
| 4,171,477 | 10/1979 | Funari | 219/56.21 |
| 4,375,396 | 3/1983 | Beggs et al. | 204/129.55 |
| 4,387,283 | 6/1983 | Peterson et al. | 219/56.21 |
| 4,473,771 | 9/1984 | Lhotsky et al. | 204/129.55 X |
| 4,572,772 | 2/1986 | Peterson | 219/56.22 X |
| 4,705,204 | 10/1987 | Hirota et al. | 219/69.17 X |
| 4,998,002 | 3/1991 | Okikawa et al. | 219/56.22 |
| 5,035,780 | 7/1991 | Suzuki et al. | 204/129.55 X |

*Primary Examiner*—Donald R. Valentine
*Attorney, Agent, or Firm*—Herbert Dubno

[57] ABSTRACT

A micromelt structure is provided on a probe tip by contacting the probe tip with a foil of the material from which the micromelt structure is to be formed and passing an electric current through the contact point to melt the foil and cause the molten foil material to collect on the tip of the probe where, by surface tension, it is drawn into a microsphere shape and homogeneously solidifies. The probe with the micromelt tip is highly reproducible and uniform and is particularly effective for use as a probe in scanning microscopy.

18 Claims, 6 Drawing Sheets

METHOD OF AND APPARATUS FOR FORMING A MICROMELT STRUCTURE ON AN ELECTRICALLY-CONDUCTIVE PROBE TIP

CROSS REFERENCE TO RELATED APPLICATION

This application is related to the commonly assigned copending application Ser. No. 07/665,768 filed May 7, 1991 based upon German application P40 07 291.6 filed Mar. 8, 1990 by us.

FIELD OF THE INVENTION

Our present invention relates to a method of forming a micromelt structure on an electrically-conductive probe tip and to an apparatus for that purpose. The term "micromelt structure" is used herein to refer to an electrically-conductive material which is applied as a melt in a very small quantity to the probe tip and solidifies from the melt in a homogeneous state on the probe tip.

BACKGROUND OF THE INVENTION

It is known to form micromelt structures by melting material in an electric field, applying that material to a tip and allowing the material to solidify thereon.

Probe tips with homogeneous characteristics at the tip ends are essential for use of probe tips in scanning power or scanning tunnel microscopy in which the probe tips serve as scanning needles in Van der Waal's alternating fields or in magnetic fields or as tunnel tips for the measurement of tunnel currents. The characteristics of such probe tips must be well defined and reproducible for such uses if the measured values at the scanning points, in scanning microscopy, are to be qualitatively and quantitatively evaluated with the desired precision.

It has been found to be important, therefore, to make such probe tips so that they not only have the desired characteristics but also can be fabricated reproducibly, i.e. so that a succession of tips can be made with identical properties. The formation of micromelt structures, if effected reproducibly on such probe tips, has been found to provide the necessary signal reproducibility and contact homogeneity.

OBJECTS OF THE INVENTION

It is, therefore, the principal object of the present invention to provide an improved method of making probe tips for the purposes described which will have micromelt structures of a high degree of homogeneity and reproducibility formed thereon.

Another object of the invention is to provide an improved method of forming a micromelt structure on a probe tip, whereby drawbacks of earlier methods of forming micromelt structures can be obviated and the structure will have the requisite degree of homogeneity and reproducibility.

It is another object of this invention to provide an improved apparatus for forming micromelt structures on probe tips or the like.

SUMMARY OF THE INVENTION

These objects and others which will become apparent hereinafter are attained, in accordance with the invention, in a method of forming a micromelt structure on an electrically conductive probe tip which comprises the steps of:

(a) contacting an electrically-conductive probe tip with a stretched-out foil of a conductive material adapted to form a micromelt structure on the tip;

(b) applying a voltage across the foil as an electrode and the tip as a counterelectrode to pass an electric current through the electrode and counterelectrode at a contact point between them of a magnitude and for a duration sufficient to melt the foil at the point and transfer a predetermined amount of molten material from the foil to the tip; and (c) solidifying the molten material in the form of a ball on the tip to form a micromelt structure thereon.

The material which is used to form the micromelt structure is thus tensioned or drawn out as a thin foil and held in the stretched-out form as an electrode and electrically connected with one pole or terminal of a voltage source. The probe tip to be provided with the micromelt structure is connected with the other pole or terminal of the voltage source and brought into contact with the foil. The electric voltage which is applied across the probe tip and the foil is so chosen that the current which flows through the contact point of the foil material with the probe tip will develop a sufficient ohmic heating to melt the foil in the immediate vicinity of the probe tip, and the molten foil material, by reason of its surface tension, will collect in a ball shape on the tip and homogeneously solidify thereon.

The electric contact between the probe tip and the foil breaks upon the gathering of the molten material on the probe tip and the surface tension acts to pull this molten material away from the remaining solid foil, thereby interrupting the flow of current and permitting the solidification of the foil material adherent to the probe tip to form the micromelt structure.

The size of the microsphere thus formed on the probe tips is determined by the amount of material melted by the current flow and is primarily established by the foil thickness, the amplitude of the applied voltage and the time interval or duration for which the current flow is maintained. The parameters which are required for any pairs of material of foil and probe and in specific size of the microsphere forming the micromelt structure are determined empirically and, once maintained, ensure reproducible production of probes with identical micromelt structure tips.

In order to maintain a particularly small micromelt structure on the probe tips and hence a small radius of curvature at the tip end, the foil should be held as thin as possible. For mechanical stabilization of particularly thin foil, it has been found to be advantageous to apply the foil to an insulating support prior to contact of the tip therewith, the insulating support forming a carrier of the foil material.

According to a feature of the invention, for the melting of the foil material, a pulse voltage or voltage pulse is applied across the tip and the foil. Thus the voltage is applied for a predetermined duration corresponding to a voltage pulse. The shorter the duration of the voltage pulse, the less foil material will be melted and thus able to collect upon the tip.

Because the tip may be particularly slender and the foil particularly thin, where it is desired to provide microspheres of very small radius and to ensure that the micromelt structure will be precisely formed at the tip end, it has been found to be advantageous to bring the tip and the foil into contact with one another by advance of the tip or the foil toward the other and while observing the advance by electron microscopy.

To form the tips with micromelt structures at the end, it has been found to be advantageous to start with electrically-conductive probe tips which are fabricated by the method and with the apparatus described in our aforementioned copending application, i.e. electrolytically.

More particularly, the tips is formed by immersing a region of an electrically-conductive wire in an electrolyte so that a free end of the wire extends into an insulating layer and electrolytically eroding the region against a ring-shaped electrode to reduce the cross section of the wire at the region until the free end separated from the remainder of the wire, thereby forming the tip.

Such probe tips have very fine probe ends with small radius of curvature and characteristics and structures which vary only within very narrow limits. Such tips are ideal for application of the micromelt structure thereto.

For carrying out the method of the invention, we may make use of an apparatus which comprises:

a support for a stretched-out foil of a conductive material adapted to form a micromelt structure on the tip;

a support for the probe tip juxtaposing the tip with the foil;

means for moving one of the supports relative to the other of the supports to bring the tip into contact with the foil; and a voltage source connected across the foil and the tip for applying a voltage across the foil as an electrode and the tip as a counterelectrode to pass an electric current through the electrode and counterelectrode at a contact point between then of a magnitude and for a duration sufficient to melt the foil at the point and transfer a predetermined amount of molten material from the foil to the tip whereby upon solidifying, the molten material forms a ball on the tip of a micromelt structure thereon.

In this apparatus, of course, one electrode is formed by the material to be applied to the probe tip in the form of a foil which can be stretched on an electrically nonconductive carrier and clamped in an electrically-conductive support, the latter being connected to one pole or terminal of the voltage source. Another conductive support carries the probe tip and means is provided to allow these two supports to be relatively moved to approach the tip of the foil surface and allow the electrical voltage to be applied thereacross.

Advantageously, the carrier to which the stretched foil is applied may also be a conductive material which, however, does not melt at the temperature at which the foil melts if the current flow is to be controlled exclusively by the duration of the electrical pulse.

For micromovement of the probe tip and/or the support carrying the foil, we prefer to make use of a piezoelectrically-movable actuating element.

According to another feature of the invention, the electrode source is a regulatable-voltage pulse generator also capable of controlling the pulse duration. Advantageously, an electron microscope is provided for monitoring the relative movement of the tip and the foil.

To ensure quality control at the tip end of the probe and the micromelt structure formed thereon, the apparatus can be provided with an analyzing device for the composition of the material transferred to the tip during transfer. The probe tips which are thus fabricated are also part of this invention as is the use thereof as scanning needles in scanning power or scanning tunnel microscopy.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
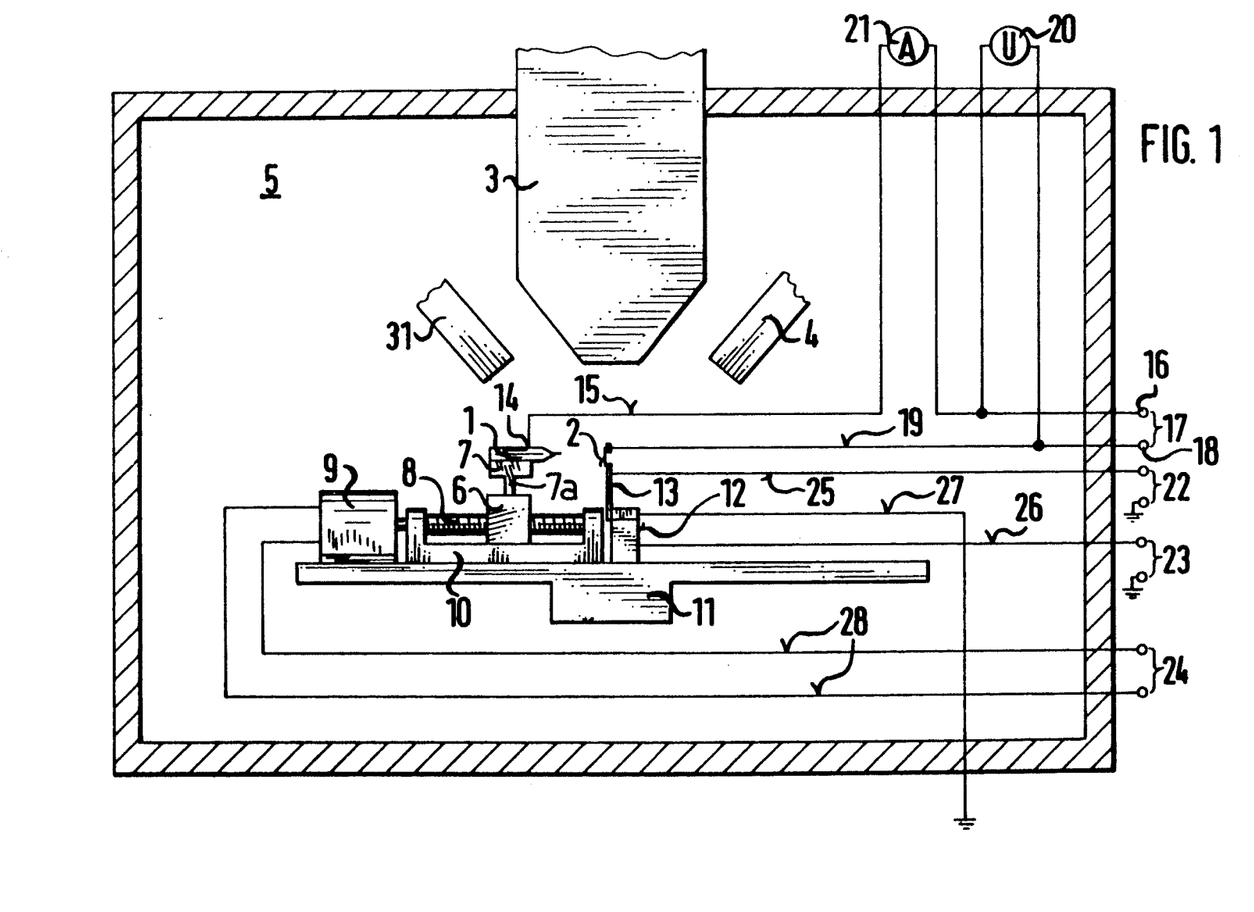
FIG. 1 is a cross sectional view in highly diagrammatic form illustrating an apparatus for applying a micromelt structure to a probe tip.
Figure 1A:
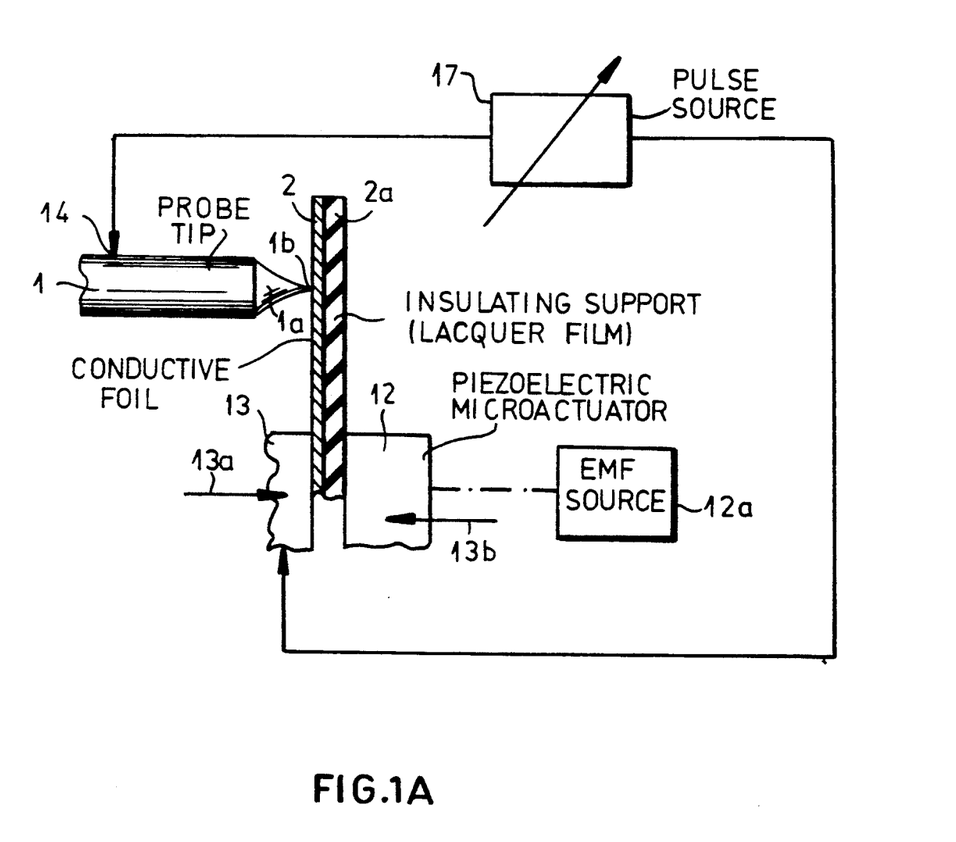
FIG. 1A is a detail view, greatly distorted in scale, illustrating principles of the invention.

Referring first to FIG. 1A, in which the principles of the invention are shown, it can be seen that a probe tip 1, whose end 1a is formed by electrolytic erosion in the manner described in our copending application mentioned previously, a microsphere of a micromelt structure is juxtaposed with a conductive foil 2 of the material from which that micromelt structure is to be formed.

The conductive foil 2 can be applied to an insulating support 2a, e.g. a lacquer film, and engaged in a conductive support represented by the clamp 13 whose clamping action is represented by the arrows 13a and 13a. The support 13 is provided with a piezoelectric microactuator 12 which can be energized by a piezoelectric crystal source 12a serving to cause the foil 2 to approach the tip 1. Of course, the actuator 12 can be provided on the support for the tip 1, not shown in FIG. 1A. A pulse source 17 having a controllable voltage level and a controllable pulse duration is applied across the probe tip 1 and the foil 2.

In operation, at the contact point 1b between the tip 1 and the foil 2, a resistive heating occurs upon application of the voltage pulse to melt the foil and cause the molten foil material to assume a globular shape by surface tension upon the tip. The homogeneous cooling of this globular shape forms the microsphere which will be described in greater detail below.

FIG. 1 shows the principles as applied to an apparatus for producing the micromelt structure on the probe tip 1 utilizing the foil 2 stretched on the lacquer substrate 2a. The micromelt structure is formed on the tip 1 in the region within the field of view of an electron microscope 3, 4 whose pole shoe 3 and detector 4 are located within a vacuum chamber 5.

The means for relatively displacing the tip 1 and the foil 2 so that they can be brought into mutual contact at the point 1b can include a positioner 6 carrying the holder or support 7 in which the tip 1 can be removably clamped. The positioner 6, in turn, can be displaced longitudinally by a threaded spindle 8 rotatable by a drive motor 9. A similar drive can be provided for the foil if desired.

The positioner is displaceable toward and away from the foil in the x direction and the tip 1 can be displaced together with holder 7 by another spindle 7a, for example, on the positioner 6 in the z direction, i.e. upwardly and downwardly.

The spindles 7a and 8 can have the finest possible pitch of the respective screw threads for accuracy in positioning. In the embodiment shown, the drive motor 9 and the spindle holder 10 are mounted upon a workplate 11.

In this embodiment, moreover, the foil 2 is also movable in the manner which has been described in connection with FIG. 1A, i.e. by the piezoelectric actuator 12 which can be mounted on the one hand on the workplate 11 and on the other hand carries the foil support 13 in which the foil 2 is clamped.

With the piezoelectric element 12, the foil 2 can be adjusted in position, while being monitored by the electron microscope, in the x, y and z directions.

Previously, of course, the positioner 6 can be used for a coarse preorientation of the probe tip 1 and foil 2 relative to one another. In that case, the actuator 12 serves only for the fine adjustment of the relative positions and the movement in which the foil is actually brought into contact with the tip.

The tip 1 has an electrical terminal 14 by means of which an electric connection 15 can be provided with one terminal 16 of the voltage source 17.

A second terminal 18 of the voltage source 17 is connected by an electric conductor 19 to the foil support 13 with which the foil 2 makes electrical contact. The voltage source 17 is an adjustable voltage pulse generator and the voltage amplitude as well as the duration of each pulse can be adjusted. The voltage U applied across the tip 1 and the foil 2 can be monitored by a voltmeter 20 while the current flow I through a contact point 1b can be monitored by the ammeter 21.

For the energization of the piezoelectric microactuator 12, control voltage sources 22 and 23 can be provided while a control voltage source 24 is provided to supply the drive motor 24. The piezoelectric element 12 is connected to the sources 22 and 23 by connecting cables 25 and 26 and through ground as represented by the grounding cable 27.

The drive motor 9 is connected to the control voltage source 24 by the electrical conductors 28.

By way of specific example, the probe tip can be composed of tungsten and can be provided with a micromelt structure of nickel. The carrier for the nickel foil 2 which has a thickness of about 20 nm is a 30 nm thick lacquer film of Formvar.

To coat the tip 1, the latter is mounted on its positioner 6 and moved toward the foil 2 to coarsely position the tip in juxtaposition with this foil. The fine movement is effected utilizing the piezoelectric microactuator 12 which displaces the foil support 13 until contact is effected, under observation of the electron microscope 3, 4.

Figure 2:
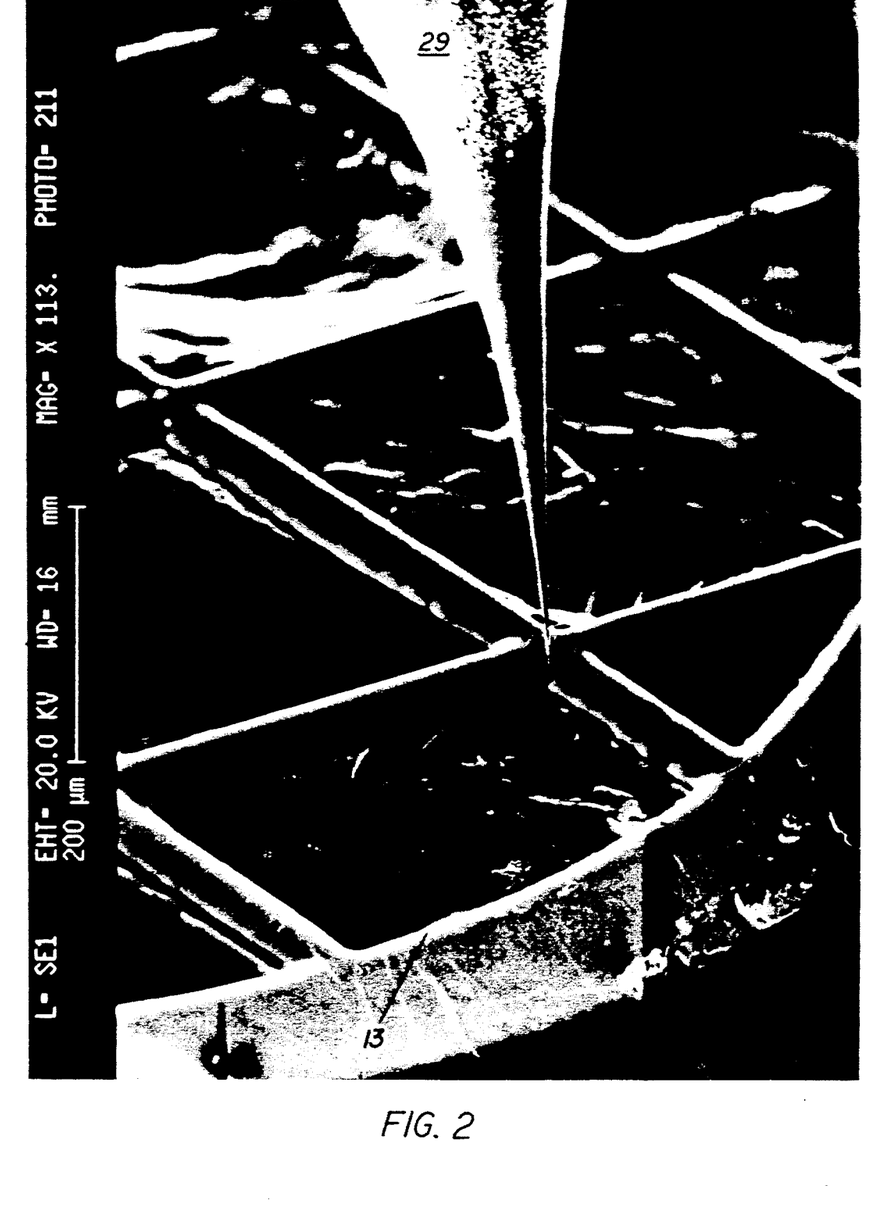
FIG. 2 is an electron microscope image of the probe tip at a slight distance from a foil stretched on a support insulating layer.

A position of the probe tip just before contact with the foil surface has been illustrated in the electron microscope picture shown in FIG. 2. In this Figure, the tip end 29 has been shown just slightly ahead of the foil 2 which is clamped in the foil support 13. Before actual contact, a voltage U of 10 volts is applied across the probe tip and the foil. The foil is then brought in contact with the tip and the resulting short-circuit current melts the foil material in the vicinity of the contact and forms a ball-shaped microstructure of the melt on the tip because of the surface-tension effect which also tears away this material from the remainder of the foil. The micromelt then solidifies and remains adherent on the probe tip.

Figure 3:
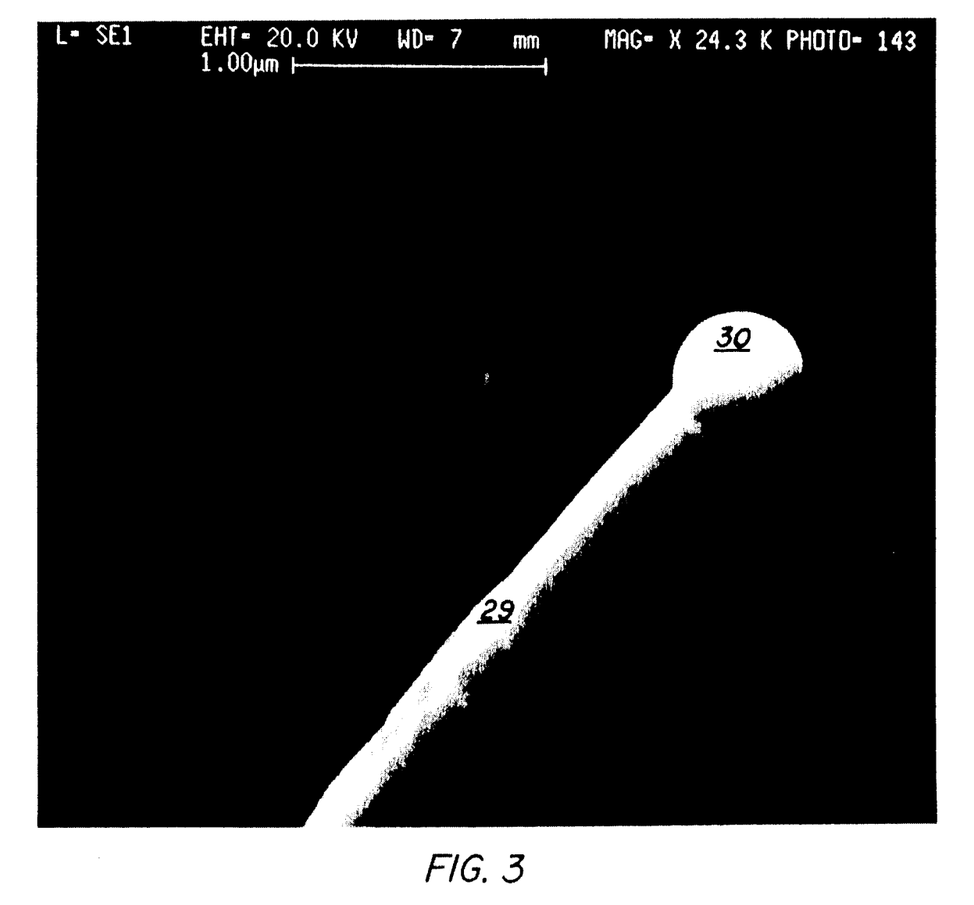
FIG. 3 is an electron microscope image showing the probe tip with the microsphere having the micromelt structure formed thereon.

An electron microscope photograph in FIG. 3 shows the microsphere 30 of nickel on the tungsten probe tip. The microsphere radius can range from several tens of nm to several hundreds of nm. In the embodiment illustrated in the microphotograph, the radius is about 250 nm. For the production of the micromelt structure on the probe tip as described, the pressure in the vacuum chamber 5 was held at $10^{-5}$ torr.

Within the vacuum chamber 5 we also provide an analyzer 31 for analyzing the micromelt structure. The analyzer 31 is actuated shortly before solidification of the microsphere formed on the tip to provide an output representing the purity of the material and the surface structure of the microsphere.

The analyzer may be x-ray crystallographic or other particle-beam analyzer.

Based upon the choice of the foil thickness, the amplitude of the applied voltage U and the duration of the pulse, the amount of material which is melted and thus which collects upon the probe tip from the contact point between the tip and the foil, can be determined. In the embodiment described, where the voltage is 10 volts, the illustrated microsphere was obtained. Microspheres of nickel can be produced under such conditions with good reproducibility on tungsten probe tips. Apart from nickel and tungsten, other material pairs can be employed. These include, for example, nickel/nickel, iron/tungsten, etc. For these material pairs, the requisite para-of foil thickness, pulse amplitude and pulse duration can be empirically determined.

Figure 4:
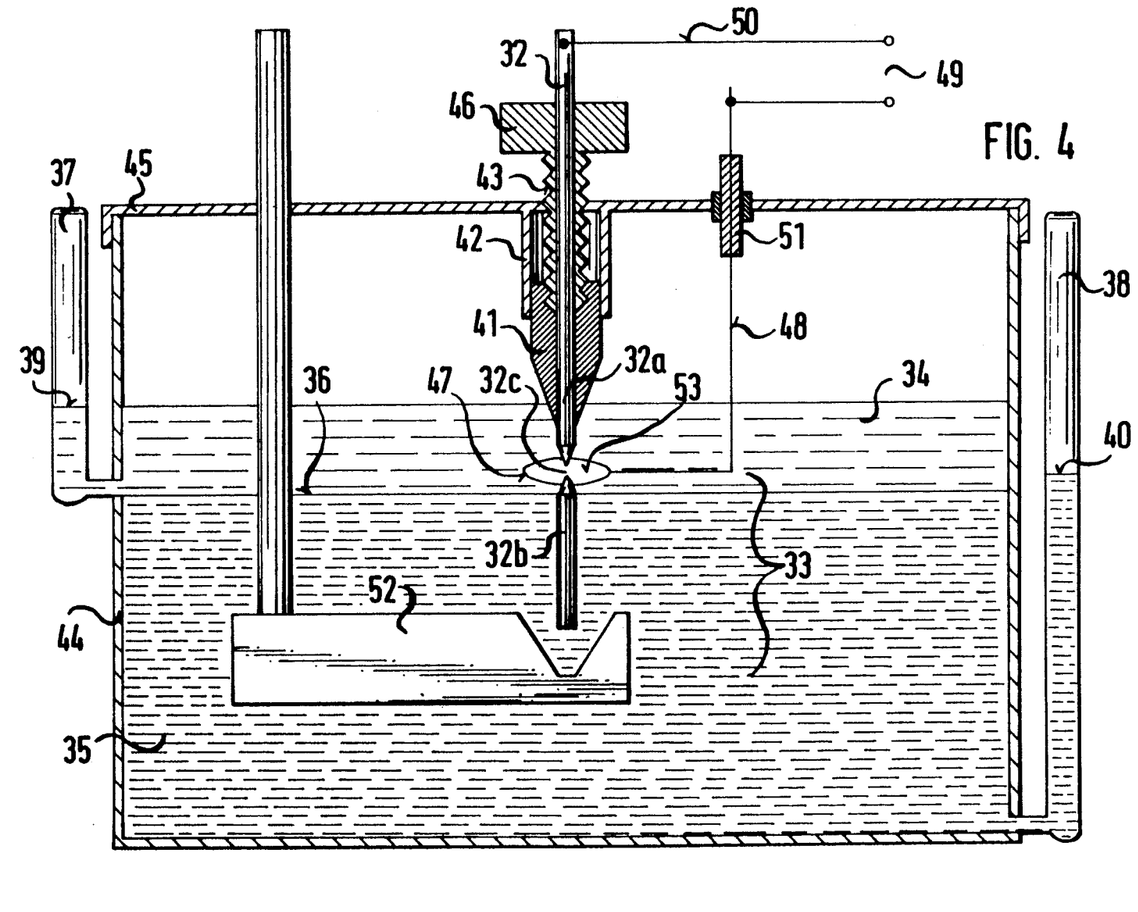
FIG. 4 is a cross sectional view illustrating an apparatus for the electrolytic production of the probe tip.
Figure 5:
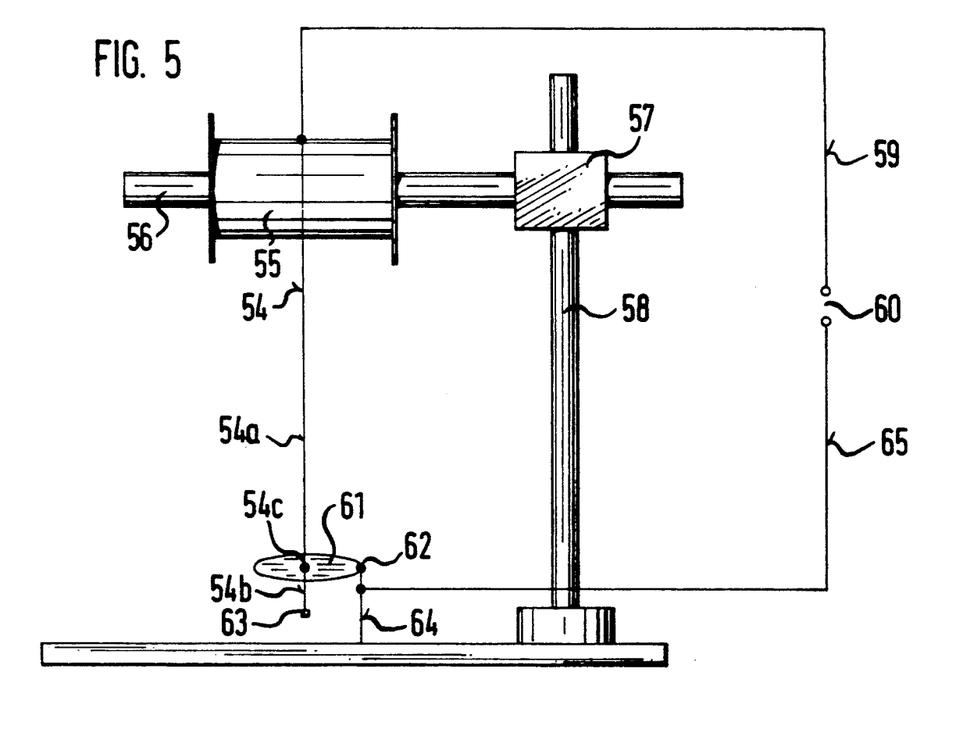
FIG. 5 is an elevational view of another apparatus for this purpose, wherein the electrolyte is in the form of a thin film spanning a ring electrode.

The probe tip can be made by the method and with the apparatus described in the aforementioned copending application and as has also been illustrated in FIGS. 4 and 5.

The apparatus shown in FIG. 4 is used to electrolytically fabricate probe tips from a probe wire 32 which is immersed in a two-layer liquid bath 33. The bath is formed from an electrolyte solution 34 and an electrically-insulating liquid 35. The insulating liquid can have a higher specific gravity than the electrolyte so that the latter floats on the former.

Between the electrolyte solution and the insulating liquid, a liquid interface or boundary 36 is provided and the position of this liquid boundary can be such that the electrolyte communicates with the upright tube 37 while the insulating liquid communicates with the upright tube 38.

The levels of the liquid surfaces 39 and 40 in both communicating tubes provide a measure of the thickness of the electrolyte solution and the insulating liquid layer and the position of the liquid boundary 38 which can be adjusted in height by varying the amount of liquid in the two layers. The surface 40 of the insulating layer in the tube 38 lies above the interface 36 by a distance which depends upon the thickness and specific gravity of the electrolyte layer 34.

The probe wire 32 from which the probe tip is to be formed has an end 32a clamped in a holder or chuck 41 and a free end 32b which extends downwardly into the insulating layer 35. Between these ends is a wire region which is to be subjected to electrolytic dissolution or machining and which has been identified at 32c. The wire 32 has been greatly exaggerated in diameter with reference to the other elements of FIG. 4. In reality for the production of probe tips, very thin probe wires are used with wire diameters of say about 100 μm. Thus in the illustration in FIG. 4, the wire diameter has been greatly distorted with respect to the size of the holder, etc.

The end 32a of the wire 32 is clamped fast in the holder 41. The holder 41 is shiftable in a rail 42 and can be moved by a spindle 43 which is received in a cover 45 of the housing 44 for the liquid bath 33. Upon rotation of an adjusting nut 46 on the spindle 43, the holder 41 can be moved upwardly or downwardly so that the wire 32 can be moved in the liquid bath 33 in a corresponding direction.

A ring electrode 47 is immersed in the electrolyte layer 34 and is juxtaposed with the region 32c. The ring electrode is connected by means of electrical conductor 48 with one pole of a voltage source 49. The counterelectrode is formed by the region 32c which is connected by the conductor 50 with the opposite terminal of the voltage source 49. The conductor 48 is electrically insulated by a feedthrough 51 relative to the wire 32.

Within the liquid bath 33, a collecting tray 52 is provided which can be shifted within the insulating liquid layer 35 beneath the free ends 32b of the wire 32 so that, as the free end 32b drops off with electrolytic machining of the region 32c, the free end 32b can be collected by the tray 52 and removed from the system.

The electrolytic erosion of the wire to form the tip continues until the free end 32b drops off, thereby reducing the wire diameter. It has been found to be advantageous to provide a traction downwardly on the free end of the wire and this can be effected by a weight (see FIG. 5). The gravitational effect downwardly increases as the cross section 32c is reduced by the electrolytic removal of the material. At the end of the machining operation, the free end 32b simply tears away form the balance of the wire 32.

Using 0.1 molar sodium hydroxide aqueous solution as an electrolyte and a ring electrode 47 of platinum with a ring diameter d of 5 mm, a tungsten wire with a starting diameter of 100 μm can be machined to form a tip end with paraboloidal taper and a tip radius of about 10 nm.

Using the apparatus shown in FIG. 4, with alternating current electrolytic etching, the tungsten wire is reduced to a thickness of about 50 μm in the region 32c.

Direct current electrolytic action is initiated with the tungsten wire connected as an anode and the platinum ring electrode has a cavity. Using electrolytic polishing conditions with a voltage U of 5 volts and a current I of 25 mA, the solubilization of the tungsten electrode is continued until the free end 32b falls off, thereby leaving a probe tip which can be provided with the micromelt structure as has been described.

In FIG. 5 we have shown an apparatus for the electrolytic production of probe tips which utilizes the same principles as that described in connection with FIG. 4 but wherein the electrolytic machining is effected in a thin film of electrolyte.

A probe wire 54 has a guided end 54a and a free end 54b both of which lie in insulating layers, namely, the layers of air above and below an electrolyte liquid membrane 61. The wire 54 is carried by a roll 55 and can be advanced through a liquid film 61 by a drive rotating the spool 55 about its horizontal axis 56. The axis 56 is defined by a bar which is supported in a cruciform bracket 57 on a post 58. The wire 54 is electrically connected by a conductor 59 with one terminal of the voltage source 60.

The electrolyte liquid membrane 61 is sustained as a liquid film spanned across a ring electrode 62. The free end 54b of the wire is weighted by a weight 63 to exert tension on the wire 54 during this electrolytic machining. The ring electrode 62 is insulated with respect to the post 58 and its base by an insulated support 64 but is connected by an electrical conductor 65 as a counterelectrode to the opposite terminal of the voltage source 60.

By way of example of the operation of the apparatus of FIG. 5, the tungsten wire is electrolytically machined with an electrolyte in the form of a 0.3 molar sodium hydroxide solution spanning the ring electrode 62 as a membrane. The diameter of the ring electrode, which is constituted of platinum, is 5 mm.

Initially, the tungsten wire has a diameter of 50 μm. The machining of the wire is effected under electrolytic-polishing conditions with voltage and current corresponding to those of FIG. 4 for the polishing action.

When the free end 54b drops off, the resulting probe tip has a tip radius of 50 nm and is provided with the micromelt structure as described in connection with FIG. 1.

We claim:

1. A method of forming a micromelt structure on an electrically conductive probe tip, comprising the steps of:
   (a) contacting an electrically conductive probe tip with a stretched-out foil of a conductive material adapted form a micromelt structure on said tip;
   (b) applying a voltage across said foil as an electrode and said tip as a counterelectrode to pass an electric current through said electrode and counterelectrode at a contact point between then of a magnitude and for a duration sufficient to melt said foil at said point and transfer an amount of molten material from said foil to said tip; and
   (c) solidifying said molten material in the form of a ball on said tip to form a micromelt structure thereon.

2. The method defined in claim 1 wherein said foil is applied to an insulating support prior to contact of said tip therewith.

3. The method defined in claim 1 wherein said voltage is applied across said tip and said foil for a duration corresponding to a voltage pulse.

4. The method defined in claim 1 wherein said tip and said foil are contacted with one another by an advance of one of said tip and said foil toward the other of said tip and said foil, said method further comprising the step of observing said advance by electron microscopy.

5. The method defined in claim 1 wherein said tip is formed by immersing a region of an electrically conductive wire in an electrolyte so that a free end of said wire extends into an insulating layer and electrolytically eroding said region against a ring-shaped electrode to reduce the cross section of said wire at said region until said free end separated from the remainder of the wire, thereby forming said tip.

6. The method defined in claim 5 wherein said foil is applied to an insulating support prior to contact of said tip therewith.

7. The method defined in claim 6 wherein said voltage is applied across said tip and said foil for a duration corresponding to a voltage pulse.

8. The method defined in claim 7 wherein said tip and said foil are contacted with one another by an advance of one of said tip and said foil toward the other of said tip and said foil, said method further comprising the step of observing said advance by electron microscopy.

9. An apparatus for forming a micromelt structure on an electrically conductive probe tip, comprising:

a support for holding a stretched-out foil of a conductive material adapted to form a micromelt structure on said tip;

a support for said probe tip juxtaposing said tip with said foil;

means for moving one of said supports relative to the other of said supports to bring said tip into contact with said foil; and a voltage source connected across said foil and said tip for applying a voltage across said foil as an electrode and said tip as a counterelectrode to pass an electric current through said electrode and counterelectrode at a contact point between then of a magnitude and for a duration sufficient to melt said foil at said point and transfer a predetermined amount of molten material from said foil to said tip whereby upon solidifying, said molten material forms a ball on said tip of a micromelt structure thereon.

10. The apparatus defined in claim 9, further comprising an insulating substrate to which said foil is applied, said support for said stretched-out foil comprising a conductive member engaging said foil and said substrate while making electrical contact with said foil.

11. The apparatus defined in claim 9 wherein at least one of said supports is provided with a piezoelectric microactuator for effecting relative movement of said tip and said foil.

12. The apparatus defined in claim 9 wherein said source is a pulse source having a controllable pulse duration and amplitude.

13. The apparatus defined in claim 9, further comprising an electron microscope trained on said point for monitoring approach of said foil and said tip.

14. The apparatus defined in claim 9, further comprising an analyzer for monitoring composition of material transferred to said tip.

15. The apparatus defined in claim 14, further comprising an insulating substrate to which said foil is applied, said support for said stretched-out foil comprising a conductive member engaging said foil and said substrate while making electrical contact with said foil.

16. The apparatus defined in claim 15 wherein at least one of said supports is provided with a piezoelectric microactuator for effecting relative movement of said tip and said foil.

17. The apparatus defined in claim 16 wherein said source is a pulse source having a controllable pulse duration and amplitude.

18. The apparatus defined in claim 17, further comprising an electron microscope trained on said point for monitoring approach of said foil and said tip.

* * * * *